(12) United States Patent
Zhou

(10) Patent No.: US 7,835,146 B2
(45) Date of Patent: Nov. 16, 2010

(54) COUPLING MECHANISM AND DISPLAY DEVICE USING THE SAME

(75) Inventor: Si-Wei Zhou, Suzhou (TW)

(73) Assignee: Qisda Corporation, Taoyuan County (TW)

( * ) Notice: Subject to any disclaimer, the term of this patent is extended or adjusted under 35 U.S.C. 154(b) by 326 days.

(21) Appl. No.: 12/073,605

(22) Filed: Mar. 7, 2008

(65) Prior Publication Data

US 2008/0232051 A1 Sep. 25, 2008

(30) Foreign Application Priority Data

Mar. 22, 2007 (TW) ............................... 96110000 A

(51) Int. Cl.
*G06F 1/16* (2006.01)
(52) U.S. Cl. .............................. 361/679.29; 361/679.22; 248/917; 248/918; 312/223.1; 312/223.2
(58) Field of Classification Search ............ 361/679.29, 361/679.58; 248/221.11
See application file for complete search history.

(56) References Cited

U.S. PATENT DOCUMENTS

| | | | | | |
|---|---|---|---|---|---|
| 5,472,162 | A | * | 12/1995 | Mason | 248/121 |
| 5,475,750 | A | * | 12/1995 | McMonagle et al. | 379/355.01 |
| 6,179,263 | B1 | * | 1/2001 | Rosen et al. | 248/278.1 |
| 6,189,850 | B1 | * | 2/2001 | Liao et al. | 248/292.14 |
| 6,679,393 | B1 | * | 1/2004 | Weaver et al. | 211/192 |
| 6,762,928 | B2 | * | 7/2004 | Lo | 361/679.58 |
| 6,874,744 | B2 | * | 4/2005 | Rawlings et al. | 248/292.14 |
| 7,175,144 | B2 | * | 2/2007 | Yen et al. | 248/221.11 |
| 7,232,098 | B2 | * | 6/2007 | Rawlings et al. | 248/121 |
| 7,237,755 | B2 | * | 7/2007 | Cho et al. | 248/274.1 |
| 7,301,759 | B2 | * | 11/2007 | Hsiung | 361/679.27 |
| 7,361,046 | B2 | * | 4/2008 | Drew | 439/353 |
| 7,518,855 | B2 | * | 4/2009 | Chu | 361/679.22 |
| 7,609,514 | B2 | * | 10/2009 | Doczy et al. | 361/679.58 |
| 7,643,276 | B2 | * | 1/2010 | Shin | 361/679.06 |
| 2003/0075649 | A1 | * | 4/2003 | Jeong et al. | 248/157 |
| 2004/0084585 | A1 | * | 5/2004 | Watanabe et al. | 248/276.1 |
| 2004/0084588 | A1 | * | 5/2004 | Liu et al. | 248/291.1 |
| 2005/0030706 | A1 | * | 2/2005 | Kim | 361/681 |
| 2007/0097617 | A1 | * | 5/2007 | Searby et al. | 361/686 |
| 2008/0035808 | A1 | * | 2/2008 | Rawlings et al. | 248/176.1 |

* cited by examiner

*Primary Examiner*—Jayprakash N Gandhi
*Assistant Examiner*—Anthony Q Edwards

(57) ABSTRACT

A coupling mechanism and a display device using the same are provided. The display device comprises a casing of the display panel, a holding arm, a coupling mechanism and a base. The holding arm is for holding the casing of the display panel. The coupling mechanism is for coupling or separating the holding arm and the casing of the display panel. The coupling mechanism comprises a positioning element, a fixing element and a pushing pillar. The positioning element having a fixing hole is disposed on the holding arm. The fixing element is for fixing at the fixing hole to connect to the holding arm and the casing of the display panel. The pushing pillar is for pressing the fixing element to separate the fixing element and the fixing hole, such that the holding arm and the casing of the display panel are separated.

10 Claims, 9 Drawing Sheets

COUPLING MECHANISM AND DISPLAY DEVICE USING THE SAME

This application claims the benefit of Republic of Taiwan application Serial No. 0961 10000, filed Mar. 22, 2007, the subject matter of which is incorporated herein by reference.

BACKGROUND OF THE INVENTION

1. Field of the Invention

The invention relates in general to a coupling mechanism and display device using the same, and more particularly to the holding arm of coupling mechanism capable of coupling or separating from the casing of the display panel, and display device using the same.

2. Description of the Related Art

Owing to match the user's operation habit, a display panel has to be placed on the desk stably. Generally, a display device includes a display panel, a base and a holding structure. The display panel is supported by a holding structure, and the other end of the holding structure is connected to the base which is set on the desk. The holding structure is typically fastened to the display panel by the screws.

Refer to FIG. 1A and FIG. 1B. FIG. 1A shows a diagram of a conventional display panel and a conventional holding structure. FIG. 1B is a cross-sectional view along the cross-sectional line 1B-1B' of the holding structure in FIG. 1A. A display device 100 includes a display panel 110 and a holding structure 120, wherein the conventional holding structure 120 is fastened to the display panel 110 by the screws 122.

Since the screws-fastening method mentioned above is not designed for do-it-yourself (DIY), the display panel has to be secured on the holding structure before delivering the display device. The volume of the holding structure combined with the display panel is huge. The bulky packages occupy too much space and fewer packages are loaded in each transportation. Thus, the cost of the transportation is increased.

SUMMARY OF THE INVENTION

The invention is directed to a coupling mechanism and display device using the same. The fixing element and the push pillar are designed for easy coupling or separating the holding arm and the casing of the display panel.

According to a first aspect of the present invention, a coupling mechanism is provided. The coupling mechanism, for coupling or separating a holding arm and a casing of the display panel, at least comprises a positioning element, a fixing element and a pushing pillar. The positioning element is disposed on the holding arm, wherein the positioning element has a fixing hole. The fixing element is used for fixing at the fixing hole to connect to the holding arm and the casing of display panel. The pushing pillar is used for pressing the fixing element to separate the fixing element from the fixing hole, thereby separating the holding arm from the casing of display panel.

According to a second aspect of the present invention, a display device is provided. The display device at least comprises a casing of the display panel, a holding arm, a coupling mechanism and a bottom base. The holding arm is used for holding the casing of the display panel. The coupling mechanism is used for coupling or separating the holding arm and the casing of the display panel. The coupling mechanism at least comprises a positioning element, a fixing element and a push pillar. The positioning element is disposed on the holding arm, wherein the positioning element has a fixing hole. The fixing element is used for fixing at the fixing hole to connect to the holding arm and the casing of the display panel. The pushing pillar is used for pressing the fixing element to separate the fixing element from the fixing hole, thereby separating the holding arm and the casing of the display panel. The base is connected to the bottom of the holding arm for supporting the holding arm and the casing of the display panel.

The invention will become apparent from the following detailed description of the preferred but non-limiting embodiments. The following description is made with reference to the accompanying drawings.

DETAILED DESCRIPTION OF THE INVENTION

Figure 1A:
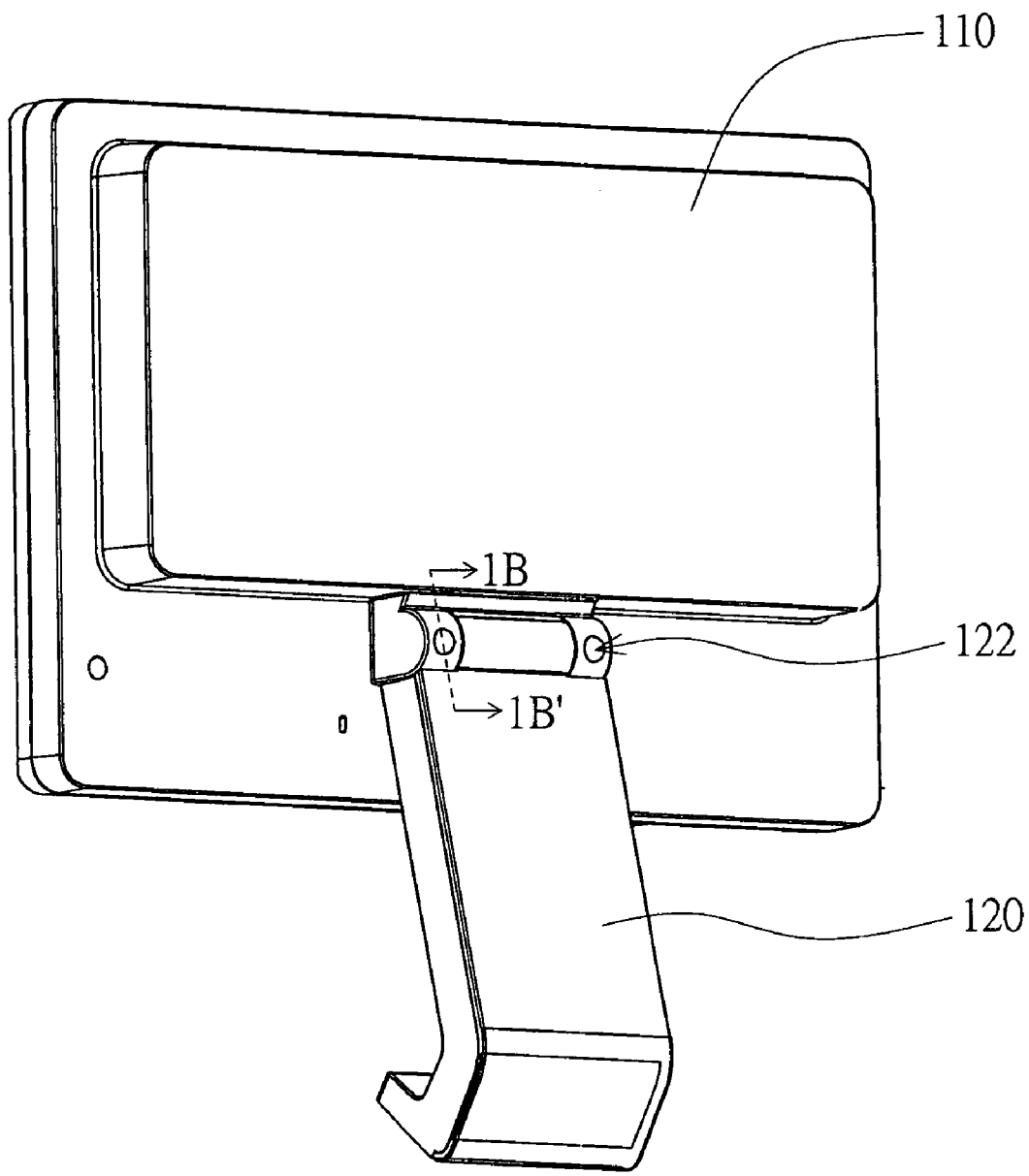
FIG. 1A (Prior Art) shows a diagram of a conventional display device and a conventional holding structure.
Figure 1B:
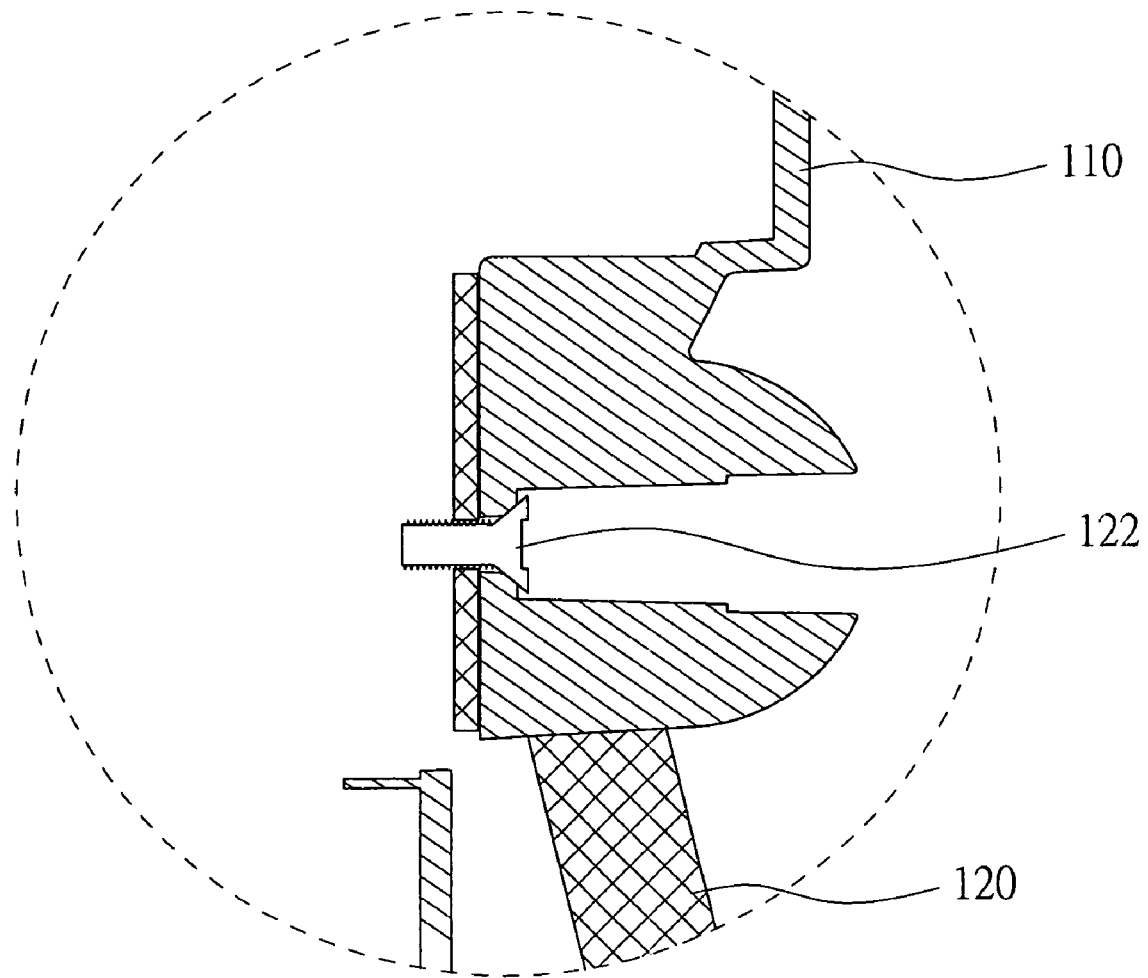
FIG. 1B (Prior Art) is a cross-sectional view along the cross-sectional line 1B-1B' of the holding structure in FIG. 1A.
Figure 2A:
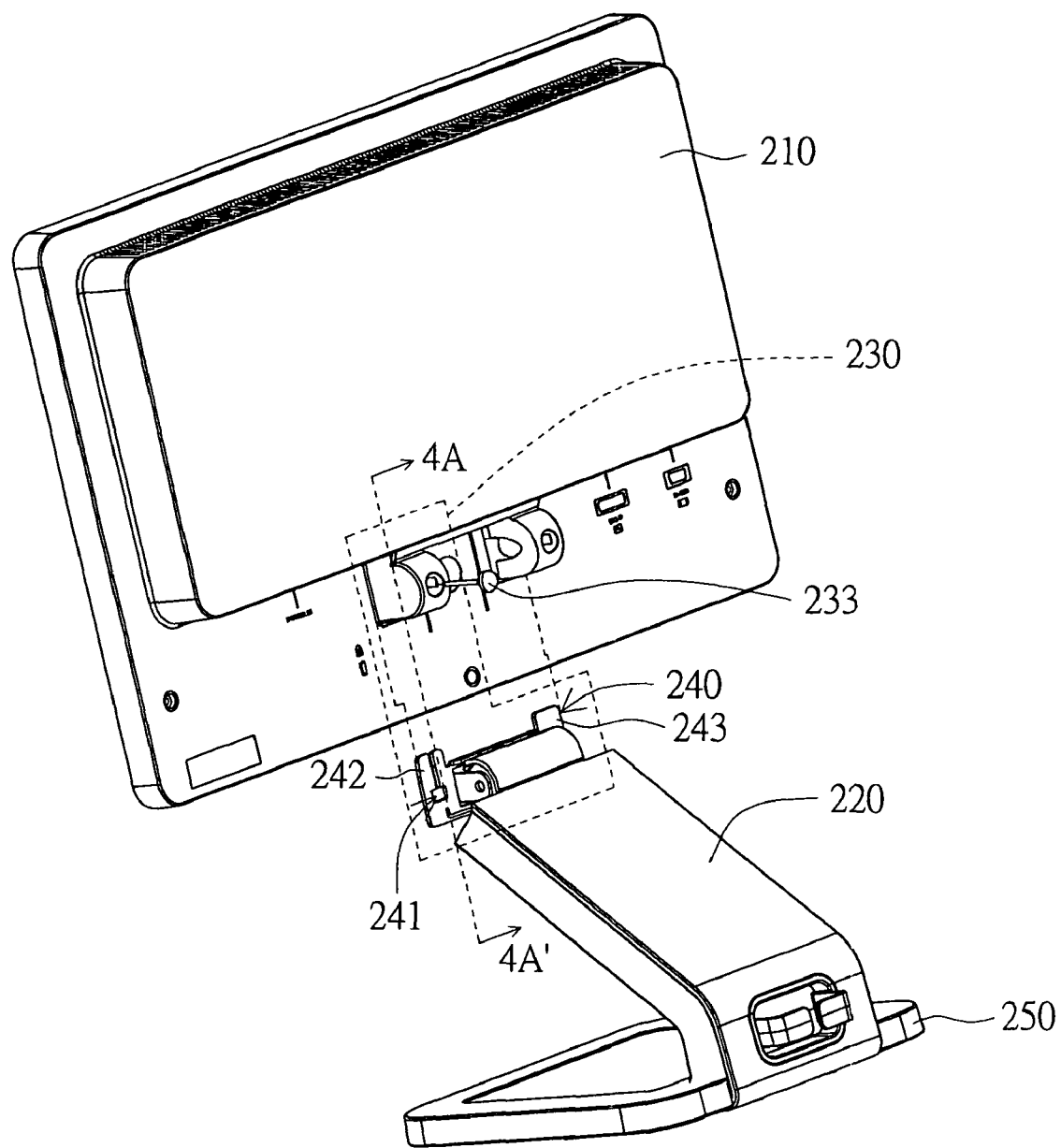
FIG. 2A shows a diagram of the casing of the display device and the holding before connection arm according to a preferred embodiment of the invention
Figure 2B:
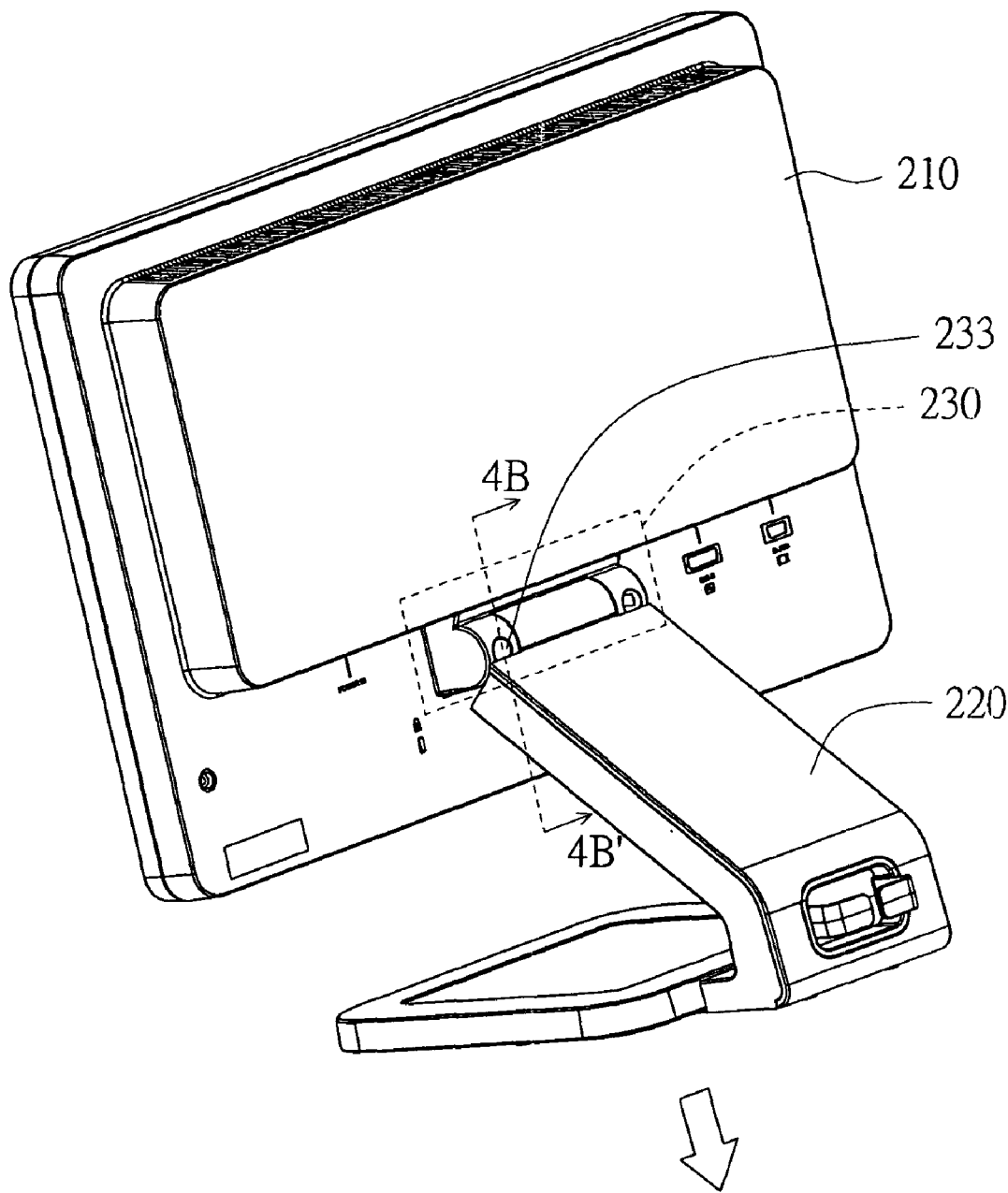
FIG. 2B shows a diagram of the casing of the display device and the holding arm of FIG. 2A after connection.

Refer both to FIG. 2A and FIG. 2B. FIG. 2A shows a diagram of the casing of the display panel and the holding arm before connection according to a preferred embodiment of the invention, and FIG. 2B shows a diagram of the casing of the display panel and the holding arm of FIG. 2A after connection. The display device 200 at least comprises a casing 210 (for receiving a display panel), a holding arm 220, a coupling mechanism 230, a base 250 and a display panel (not shown). The holding arm 220 is used for supporting the casing 210 of the display panel. The base 250 is connected to the bottom end of the holding arm 220 for supporting the holding arm 220 and the casing 210 of the display panel.

The coupling mechanism 230 is used for coupling or separating the holding arm 220 and the casing 210 of the display panel. The coupling mechanism 230 at least comprises a positioning element 240, a fixing element 232 (as shown in FIG. 3B) and a push pillar 233. As shown in FIG. 2A, the positioning element 240 is disposed on the holding arm 220, wherein the positioning element 240 has a fixing hole 241. The fixing element 232 and push pillar 233 are disposed on the casing 210 of the display panel, wherein the fixing element 232 is clasped in the fixing hole 241 for coupling the holding arm 220 and the casing 210 of the display panel.

As shown in FIG. 2B, the holding arm 220 is coupled with the casing 210 of the display panel through the positioning element 240. If the user wants to separate the holding arm 220 and the casing of the display device 210, it is required to press the push pillar 233. Then, the push pillar 233 presses the fixing element 232 for separated the fixing element 232 from the fixing hole 241. Accordingly, the holding arm 220 could be detached from the casing 210 of the display device.

Figure 3A:
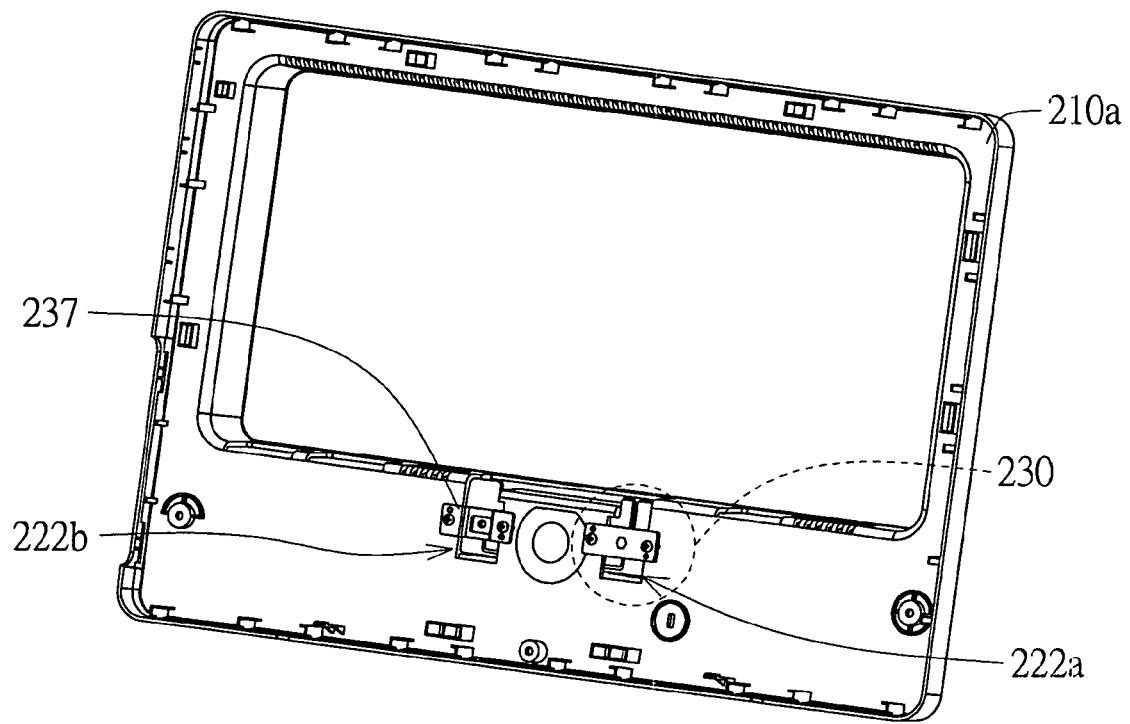
FIG. 3A is a diagram of the inner side of the rear casing of the display device in FIG. 2A.
Figure 3B:
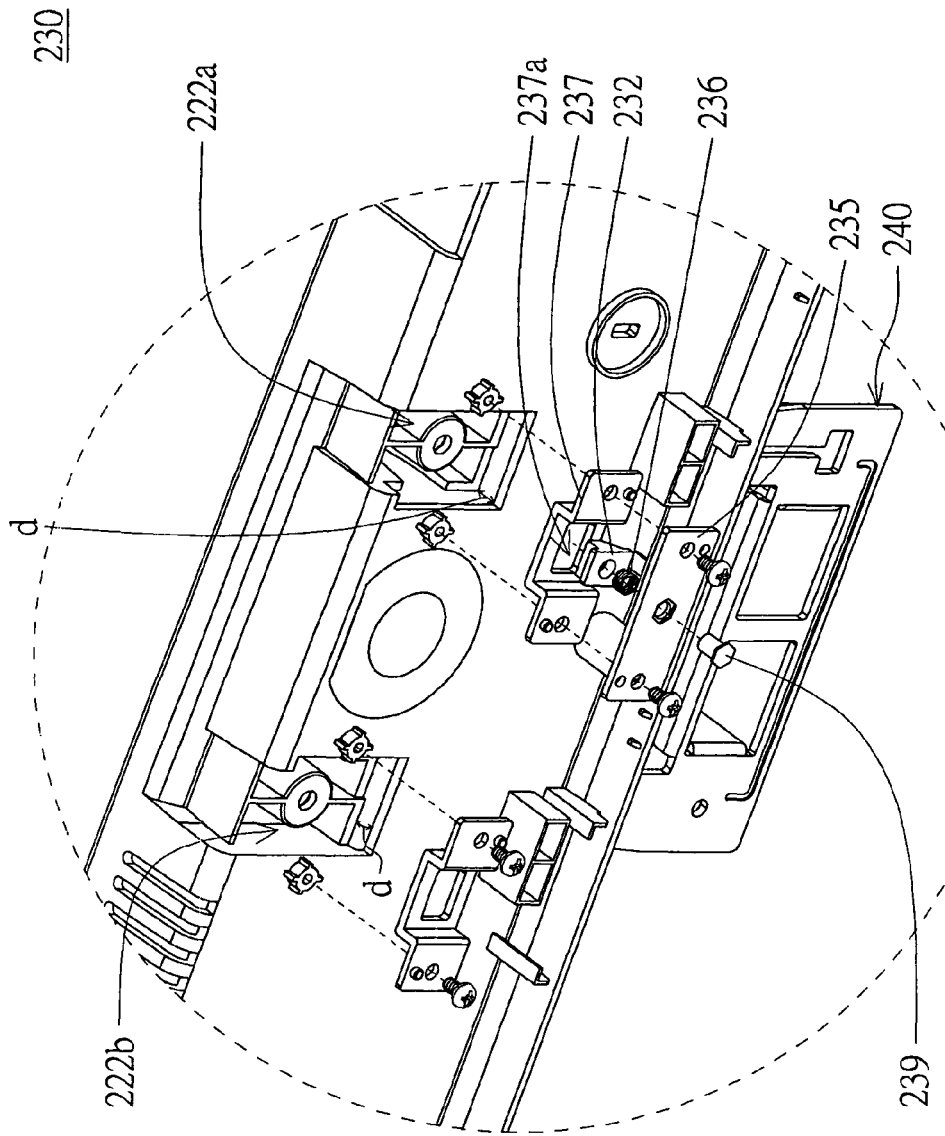
FIG. 3B is an exploded view according to FIG. 3A.

Refer to the FIG. 3A. FIG. 3A is a diagram of the inner side of the rear casing of the display panel in the FIG. 2A. In this embodiment, the inner side 210a of the casing 210 of the display panel has a first opening 222a and a second opening 222b, wherein the coupling mechanism 230 is disposed at the position corresponding to the first opening 222a.

Refer to FIG. 3B. FIG. 3B is an exploded view according to FIG. 3A. The coupling mechanism 230 further comprises a fastening element 235, an elastic element 236 and a pressing piece 237. The pressing piece 237 is a convex structure and has a through hole 237a. In this embodiment, the elastic element 236 and the fixing element 232 are preferably disposed between the fastening element 235 and the pressing piece 237. A rivet 239 is fixed on the fastening element 235 through a stamping method. And the elastic element 236 and the fixing element 232 are jointed on the rivet 239. Alternatively, the rivet 239 could be replaced by screws for fixing the elastic element 236 and the fixing element 232.

Among the elements of the coupling mechanism 230, the push pillar 233 is disposed on the outside corresponding to the inner side 210a of the casing 210 of the display panel, and other elements are disposed at the inner side 210a of the casing 210 of the display panel. So the push pillar 233 is not drawn in FIG. 3B. The outside corresponding to the inner side 210a of the casing 210 of the display panel has a gap d for the insertion of the position element 240. The width of the positioning element 240 is preferably corresponding to the width of the gap d such that it is easy to insert the positioning element 240 into the gap d of the inner side 210a of the casing 210 of the display panel.

Figure 3C:
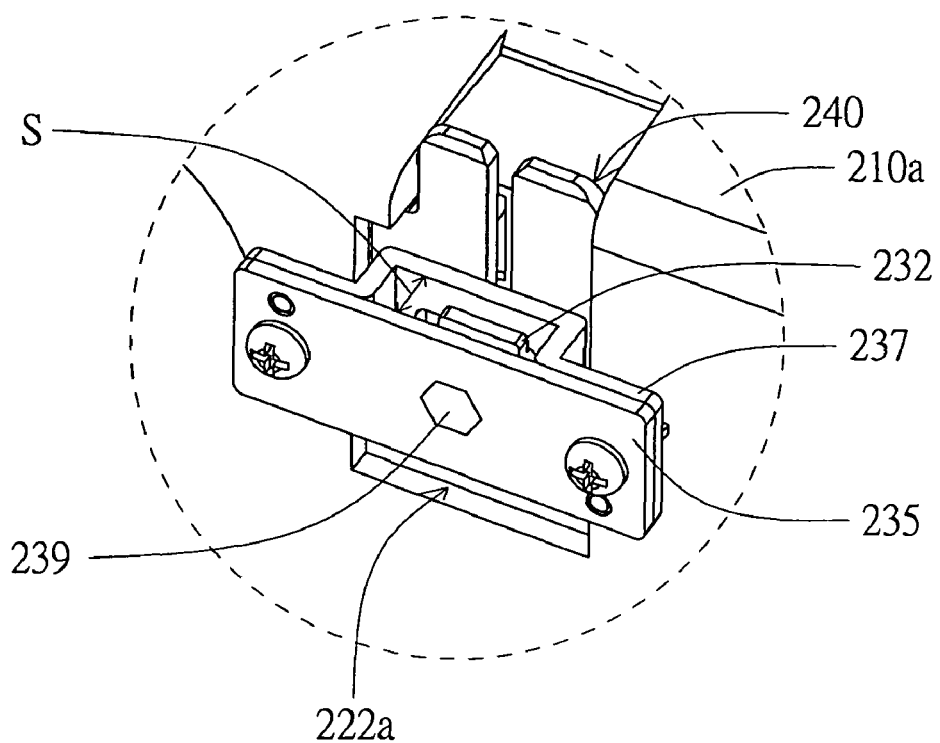
FIG. 3C is an enlarged diagram according to the coupling mechanism of FIG. 3A.

Refer to FIG. 3C. FIG. 3C is an enlarged diagram according to the coupling mechanism of FIG. 3A. The elements of the coupling mechanism 230 presented in FIG. 3C are sequentially fixed on the first opening 222a of the inner side 210a of the casing 210 of the display panel according to the illustration of FIG. 3B. Two ends of the pressing piece 237 and the fixing element 235 are fastened on the inner side 210a by the screws. Due to the convex structure of the pressing piece 237 faces the first opening 222a of the inner side 210a of the casing 210 of the display panel, a space S is created between the pressing piece 237 and fastening element 235. The fixing element 232 and the elastic element 236 are disposed in the space S. Because the elastic element 236 is covered by the fastening element 235, the elastic element 236 cannot be shown in FIG. 3C.

Figure 3D:
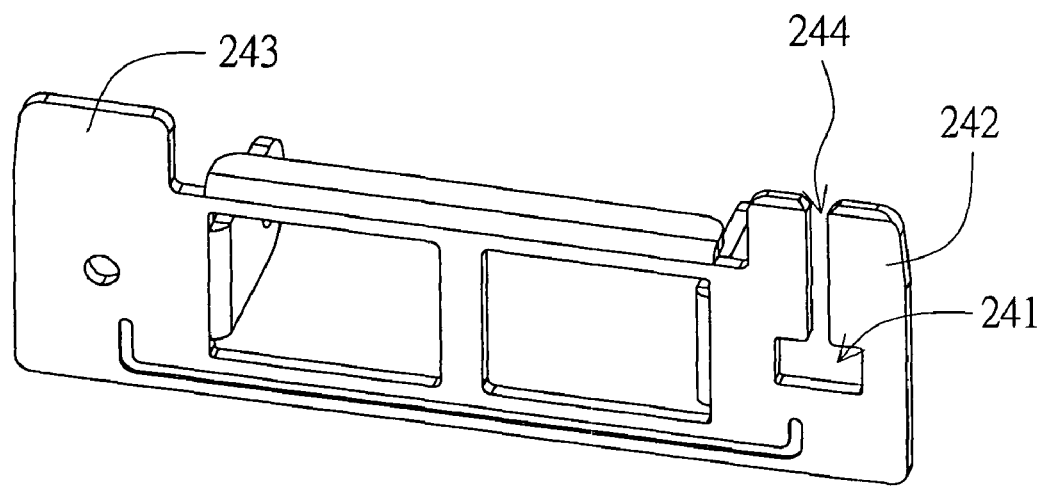
FIG. 3D is a diagram according to the positioning element in the FIG. 3A.

Please refer to FIG. 3A and FIG. 3D. FIG. 3D is a diagram of the positioning element in the FIG. 3A. In this embodiment, the inner side 210a of the casing 210 of the display panel has the first opening 222a and the second opening 222b. Thus, two ends of the poisoning element 240 include a first inserting portion 242 and a second inserting portion 243, respectively corresponding to the first opening 222a and second opening 222b. The first inserting portion 242 preferably has a positioning channel 244, which communicates with the fixing hole 241.

Figure 4A:
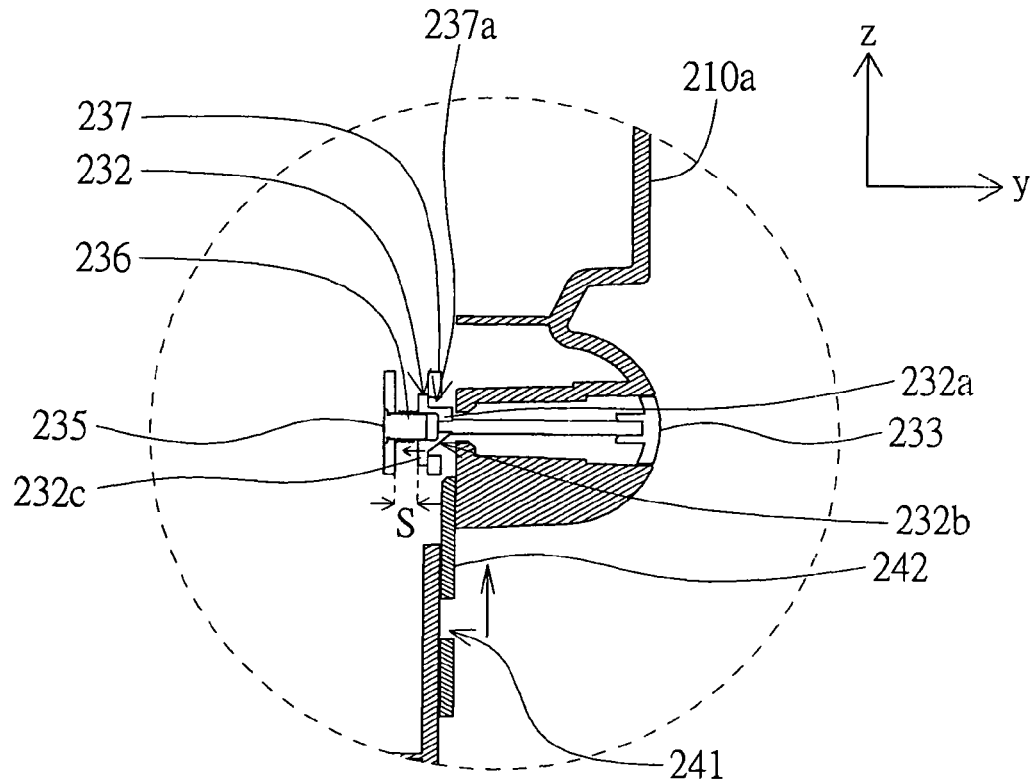
FIG. 4A is a cross-sectional view along the cross-sectional line 4A-4A' in FIG. 2A.

Refer to FIG. 4A. FIG. 4A is a cross-sectional view along the cross-sectional line 4A-4A' in FIG. 2A. With the elastic element 236, the fixing element 232 is movable back and forth in the space S between the pressing piece 237 and the fastening element 235. When an external force applies on the elastic element 236, the elastic element 236 is compressed. When the external force disappears, the elastic element 236 regains its original shape. Therefore, the fixing element 232 can be driven in the space S due to the compressed and uncompressed elastic element 236.

The fixing element 232 includes a projection 232a, a stopper 232c and a slanted plane 232b. The projection 232a is smaller than the through hole 237a so that the projection 232a movably protrudes from the through hole 237a. The length of stopper 232c is larger than the diameter of the trough hole 237a so that the back-and-forth movement of the fixing element 232 is limited in the space S. The bottom of the fixing element 232 has the slanted plane 232b. When the fixing element 232 is pressed by the positioning element 240, the fixing element 232 moves toward the fastening element 235 due to the slanted plane 232b.

Please refer to both FIG. 2A and FIG. 4A. As shown in FIG. 2A, when the holding arm 220 is going to connect to the casing 210 of the display panel, the positioning element 240 is inserted into the casing 210 of the display panel for connecting the holding arm 220 to the casing 210.

As shown in FIG. 4A. Before the positioning element 240 is inserted in the inner side 210a of the casing 210 of the display panel, the projection 232a of the fixing element 232 is located within the through hole 237a. When the positioning element 240 is inserted toward the fixing element 232 along z direction (i.e. the upward arrow of FIG. 4A), the positioning channel 244 of the first inserting portion 242 (as shown in FIG. 3D) passes through the push pillar 233 until the positioning element 240 contacts with the slanted plane 232b of the fixing element 232.

When the slanted plane 232b of the fixing element 232 is pushed by the first inserting portion 242, the z direction of the force is transferred to the y-direction force due to the slanted plane 232b of the fixing element 232. Thus, the elastic element 236 is compressed by the y-direction force, and both of the elastic element 236 and the fixing element 232 are moved toward the fastening element 235 along -y direction.

Figure 4B:
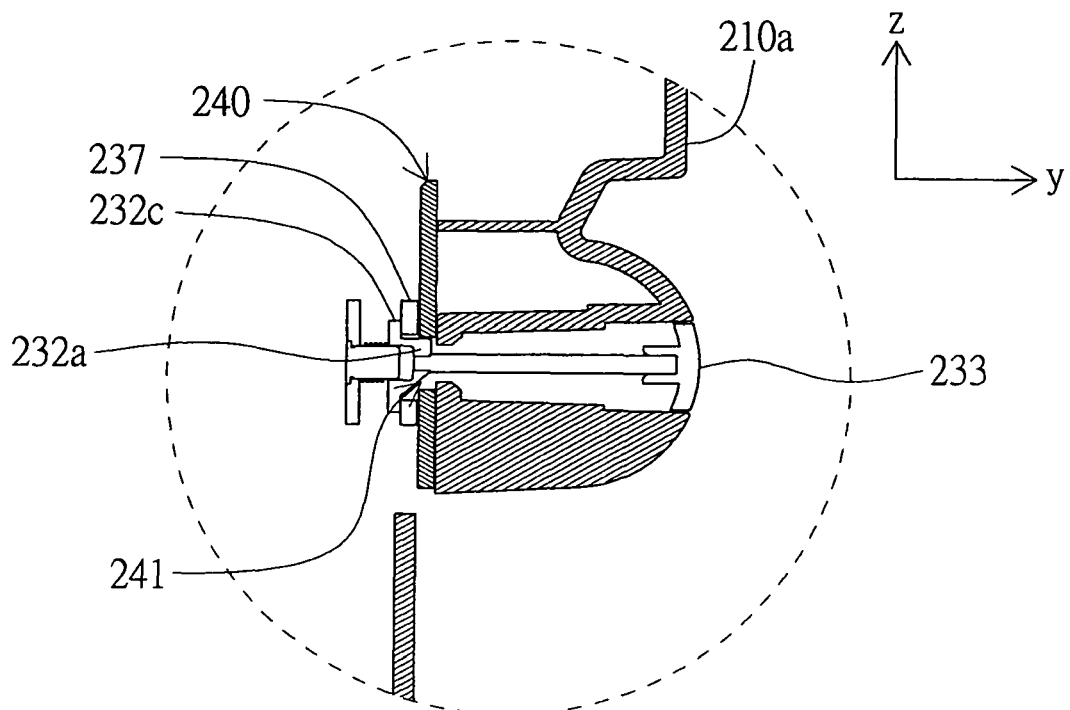
FIG. 4B is a cross-sectional view along the cross-sectional line 4B-4B' in FIG. 2B.

Please refer to FIG. 4A and FIG. 4B. FIG. 4B is a cross-sectional view along the cross-sectional line 4B-4B' in FIG. 2B. When the positioning element 240 is continuously inserted along z direction, the positioning element 240 keeps pushing the fixing element 232 with the y-direction force until the fixing hole 241 of positioning element 240 contacts with the fixing element 232. No force from the positioning element 240 is applied to the fixing element 232 when the fixing hole 241 matches the fixing element 232. As shown in FIG. 4B, after the y-direction force disappears, the elastic element 236 regains its original shape and the recovery force of the elastic element 236 drives the fixing element 232 to move toward the push pillar 233 along y direction until the fixing element 232 fixes into the fixing hole 241. Thus, the holding arm 220 connected to the casing 210 of the display panel each other is completed (as shown in FIG. 2B).

Figure 4C:
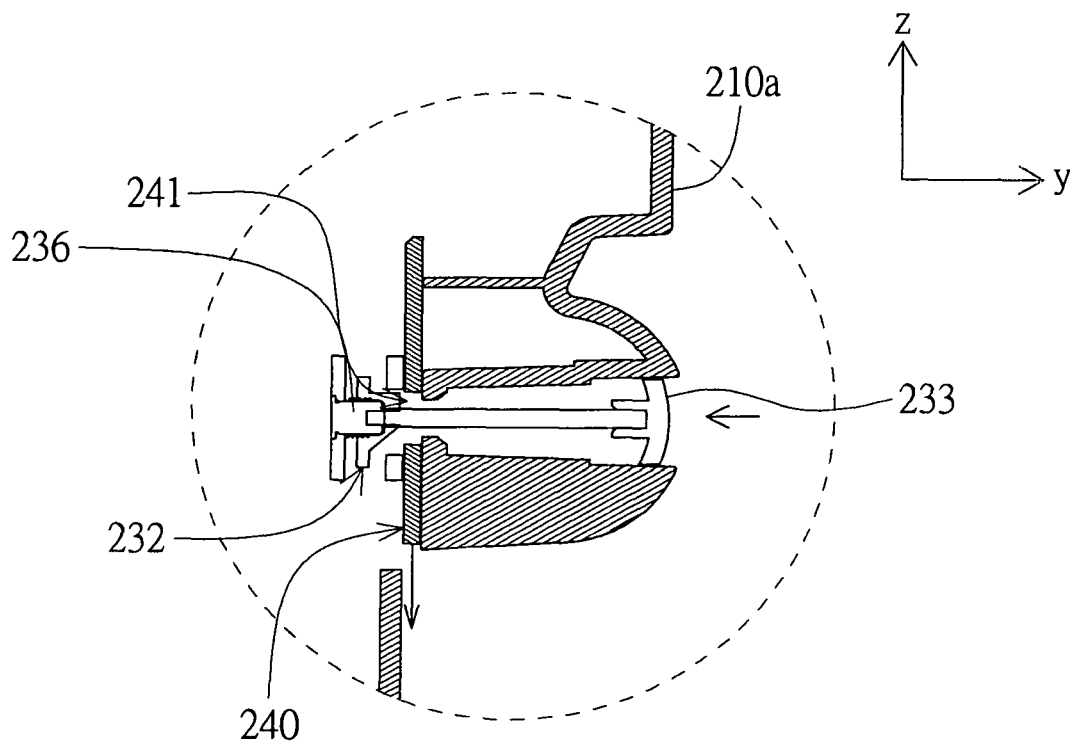
FIG. 4C is a cross-sectional view showing the push pillar along the cross-sectional line 4B-4B' in FIG. 2B, which the push pillar is pressed by an external force along −y direction.

Please refer to FIG. 4C. FIG. 4C is a cross-sectional view showing the push pillar along the cross-sectional line 4B-4B' in FIG. 2B, which the push pillar is pressed by an external force along -y direction. When an external force (i.e. the arrow points to the left) applies on the push pillar 233 along -y direction, the push pillar 233 presses the fixing element 232 for compressing compressing the elastic element 236 such that the fixing element 232 separates from the through hole 237a. When the fixing element 232 separates from the through hole 237a, the positioning element 240 could be pull out along the inserting path (i.e. the arrow along −z direction) for separating the holding arm 220 from the casing 210 of the display panel.

Please refer to FIG. 3A and FIG. 3B again. In this embodiment, the pressing piece 237 is disposed on the second opening 222b (i.e. left of FIG. 3B) of the inner side 210a of the casing 210 of the display panel for conjugating the holding arm 220 and the casing 210 of the panel. The convex structure of the pressing piece 237 is correspondingly against the second opening 222b.

Figure 3E:
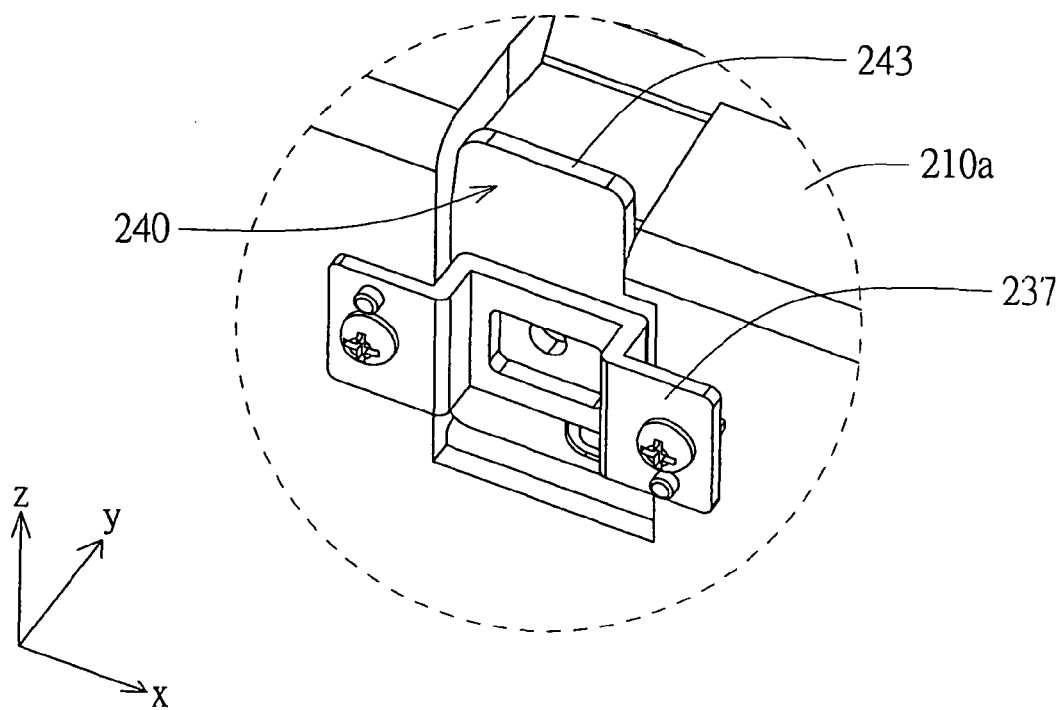
FIG. 3E is an enlarged diagram according to the second opening in FIG.3A.

Refer to FIG. 3E. FIG. 3E is an enlarged diagram according to the second opening in FIG. 3A. The positioning element 240 is inserted into the gap d (as shown in FIG. 3B) of the inner side 210a with the second inserting portion 243. The second inserting portion 243 is pressed against the pressing piece 237 and inner side 210a of casing 210 of the display panel, so that the positioning element 240 is fixed at the x direction and y direction by the pressing piece 247 and the inner side 210a of the casing 210 of the display panel. Moreover, the first inserting portion 242 of the positioning element 240 is fixed at the first opening 222a by the fixing element 232 (as shown in FIG. 3C), the second inserting portion 243 is therefore capable be fixed at the second opening 222b in the z direction by the first inserting portion 242. Since the second inserting portion 243 is well fixed at x, y and z directions, it is securely fixed at the second opening 222b.

In this embodiment, the coupling mechanism 230 is preferably disposed at one end of the casing 210 of the display panel, and only the pressing piece 237 is disposed at the other end of the casing 210 for easy operation. However, it is, of course, noted that the coupling mechanism 230 could be disposed on one end only, or disposed on two ends of the casing 210. The practical applications can be optionally modified and are not limited by the embodiment presented herein.

According to the coupling mechanism and display device using the same disclosed in the above-mentioned embodiments of the present invention, the casing of the display panel and the holding arm are coupled or separated by coupling or separating of coupling mechanism and the positioning element 240. With those designs, the casing of the display panel and the holding arm can be disassembled quickly and reduce the package volume of the display device. Thus, more packages can be loaded in each transportation, and the cost, especially the cost of transportation, can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A coupling mechanism, for coupling or separating a holding arm and a casing of a display panel, the coupling mechanism at least comprising:
   a positioning element disposed on the holding arm, wherein the positioning element has a fixing hole;
   a fixing element for fixing at the fixing hole to connect the holding arm and the casing of the display panel;
   a pushing pillar for pressing the fixing element to separate the fixing element from the fixing hole, thereby separating the holding arm from the casing of the display panel;
   a fastening element, disposed on the casing of the display panel; and
   an elastic element, having elastic characteristic and disposed between the fixing element and the fastening element, wherein one end of the elastic element is fixed on the fastening element, and the other end of the elastic element is against the fixing element, wherein when the elastic element is pressed by a force, the elastic element is compressed, and when the force is disappeared, the elastic element regains its original shape, such that the fixing element is moved back and forth by the elastic element.

2. The coupling mechanism according to claim 1, wherein the bottom of the fixing element has a slanted plane, such that when the fixing element is pressed by the positioning element, the fixing element moves toward the fastening element.

3. The coupling mechanism according to claim 1 further comprising:
   a pressing piece which is a convex structure, wherein the pressing piece is disposed between the fastening element and the casing of the display panel, and the pressing piece has a through hole which creates a space for the fixing element, and the movement of the fixing element is limited in the space.

4. The coupling mechanism according to the claim 3, wherein the fixing element comprises:
   a projection movably protruded from the through hole; and
   a stopper for limited the movement of the fixing element in the space, wherein the length of the stopper is larger than the diameter of the through hole.

5. The coupling mechanism according to the claim 1, wherein the positioning element has at least one positioning channel, which communicates with the fixing hole, wherein during the process of inserting the positioning element in the fixing element, the positioning channel is used for allowing the push pillar passing through.

6. A display device, at least comprising:
   a casing of a display panel;
   a holding arm for holding the casing of the display panel;
   a coupling mechanism, for coupling or separating the holding arm and the casing of the display panel, the coupling mechanism at least comprising:
   a positioning element disposed on the holding arm, wherein the positioning element has a fixing hole;
   a fixing element for fixing at the fixing hole to connect to the holding arm and the casing of the display panel; and
   a pushing pillar for pressing the fixing element to separate the fixing element from the fixing hole, thereby separating the holding arm from the casing of the display panel;
   a base connected to a bottom of the holding arm for supporting the holding arm and the casing of the display panel;
   a fastening element, disposed on the casing of the display panel; and
   an elastic element, having elastic characteristic and disposed between the fixing element and the fastening element, wherein one end of the elastic element is fixed on the fastening element, and the other end of the elastic element is against the fixing element, wherein when the elastic element is pressed by a force, the elastic element is compressed, and when the force is disappeared, the elastic element regains its original shape, such that the fixing element is moved back and forth by the elastic element.

7. The display device according to claim 6, wherein the bottom of the fixing element has a slanted plane, such that when the fixing element is pressed by the positioning element, the fixing element moves toward the fastening element.

8. The display device according to claim 6, wherein the coupling mechanism further comprising:
   a pressing piece which is a convex structure, wherein the pressing piece is disposed between the fastening element and the casing of the display panel, and the pressing piece has a through hole which creates a space for the fixing element, and the movement of the fixing element is limited in the space.

9. The display device according to the claim 8, wherein the fixing element comprises:
   a projection movably protruded from the through hole; and
   a stopper for limited the movement of the fixing element in the space, wherein the length of the stopper is larger than the diameter of the through hole.

10. The display device according to the claim 6, wherein the positioning element has at least one positioning channel, which communicates with the fixing hole, wherein during the process of inserting the positioning element in the fixing element, the positioning channel is used for allowing the push pillar passing through.

* * * * *